United States Patent [19]

Ejima et al.

[11] Patent Number: 5,179,668
[45] Date of Patent: Jan. 12, 1993

[54] SIGNAL PROCESSOR

[75] Inventors: Hideji Ejima; Hajime Nishidai, both of Kyoto, Japan

[73] Assignee: Omron Corporation, Kyoto, Japan

[21] Appl. No.: 710,551

[22] Filed: Jun. 5, 1991

[30] Foreign Application Priority Data

Jun. 11, 1990 [JP] Japan .................. 2-152295

[51] Int. Cl.⁵ ............................................ G06F 13/14
[52] U.S. Cl. ................................ 395/275; 395/800; 364/DIG. 1; 364/238.3; 364/240.7; 364/274.3
[58] Field of Search ............... 395/275, 725, 775, 800

[56] References Cited

U.S. PATENT DOCUMENTS

| | | | |
|---|---|---|---|
| 4,920,480 | 4/1990 | Murakami et al. | 395/800 |
| 4,959,782 | 9/1990 | Tulpule et al. | 395/275 |
| 5,045,993 | 9/1991 | Murakami et al. | 395/375 |

Primary Examiner—Michael R. Fleming
Assistant Examiner—Debra A. Chun
Attorney, Agent, or Firm—Dickstein, Shapiro & Morin

[57] ABSTRACT

The invention relates to a signal processor to be built into a controller or the like for receiving various input signals and generating control signals according to the input signals. The signal processor includes an internal bus interconnecting various components of the signal processor. The invention also includes a first input-output controller for controlling the application of input signals to the signal processor and the output of control signals from the signal processor. The first input-output controller operates under the control of a switch in which the switching criteria for the switch is whether or not the signal processor is using its internal bus. Accordingly, the first input-output controller is allowed access to the signal processor depending on whether or not the internal bus of the signal processor is being used.

7 Claims, 4 Drawing Sheets

1

SIGNAL PROCESSOR

BACKGROUND OF THE INVENTION

1. Field of the Invention

The present invention relates to a signal processor which is built into a controller or the like for receiving a variety of signals, executing arithmetic and other operations on knowledge data in accordance with said signals and outputting control signals based on said knowledge data and more particularly to a novel bus connecting arrangement permitting direct access from a superior CPU to an internal knowledge data memory within the processor.

2. Description of the Prior Art

The commanding unit, such as a microprocessor or fuzzy processor, of various controllers has its own memory for storing knowledge data to be used in arithmetic or other operations. However, the interface for such memory is exclusively available to the microprocessor or fuzzy processor, and for access from a superior CPU to this knowledge data memory, a timing circuit for external access (hereinafter referred to as the arbiter circuit) is additionally required. Access from such a CPU to a control circuitry within the processor also requires an arbiter circuit. In such an arrangement, the status of operation of the processor is constantly monitored and switchovers are made using a plurality of arbiters.

However, the above prior art arrangement requires at least two arbiter circuits for access from the superior CPU to the processor and to its associated knowledge data memory, with the result that the whole circuit configuration is complicated. Moreover, installation of such arbiters not only increases the bulk of the device but adds to the initial cost of the device.

Furthermore, to provide for cases in which a plurality of demands compete for the knowledge data stored in said memory, it is common practice to load the memory with a software for setting an order of priority of such demands but if a bug exists in the software, the software will be a source of operational error. Therefore, this risk must be taken into consideration as a design factor.

Incorporation of such a software adds complexity to system architecture and calls for additional development time.

The present invention obviates the above-mentioned disadvantages. Thus, it is an object of the invention to provide a signal processor which is simple in circuit configuration and space-saving, contributory to cost reduction and, because of signal processing by hardware, insures high signal transmission accuracy and ease in system architecture.

Other objects and advantages of the invention will become apparent from the following description and accompanying drawings.

SUMMARY OF THE INVENTION

The present invention is directed to a signal processor to be built into a controller or the like for receiving various signals as inputs and generating control signals as outputs according to the input signals, comprising a first input-output control means for controlling the input of said various signals and the output of control signals generated by the processor, a status register connected to said first input-output means for indicating whether the processor is using an internal bus thereof, an operational means connected to said internal bus for executing an arithmetic or other operation to provide knowledge data according to signals from said first input-output control means, a second input-output control means for storing the knowledge data provided by said operational means in an internal memory means and controlling said status register, a switch means connected to said second input-output means through an input-output register and adapted to be switched on or off according to the status of use of said internal bus as indicated by said status register, and a data bus for enabling access between said first input-output control means and said memory means.

It will be apparent from the above description that because the processor of the invention includes a built-in switch means for controlling the input of signals to the first input-output control means and permitting association with the second control means, the knowledge data stored in the internal memory of the processor can be efficiently transmitted and even when a plurality of demands for the memorized knowledge data are made to the processor, the status register sets the order of priority to all controls in hardware construction. Therefore, not only an accurate data transmission is insured but a one-chip microprocessor with a simple circuit configuration and a freedom of change in knowledge data can be employed to simplify the system architecture. Moreover, the invention enables effective utilization of space, insures ease of use and promises a reduction of manufacturing cost.

BRIEF DESCRIPTION OF THE DRAWINGS

FIGS. 2 (b) and (c) are elementary diagrams showing the circuit operation and switching signal operation in the processor of the invention.

DETAILED DESCRIPTION OF THE PREFERRED EMBODIMENTS

A preferred embodiment of the invention is now described in detail, reference being had to the accompanying drawings.

Figure 1:
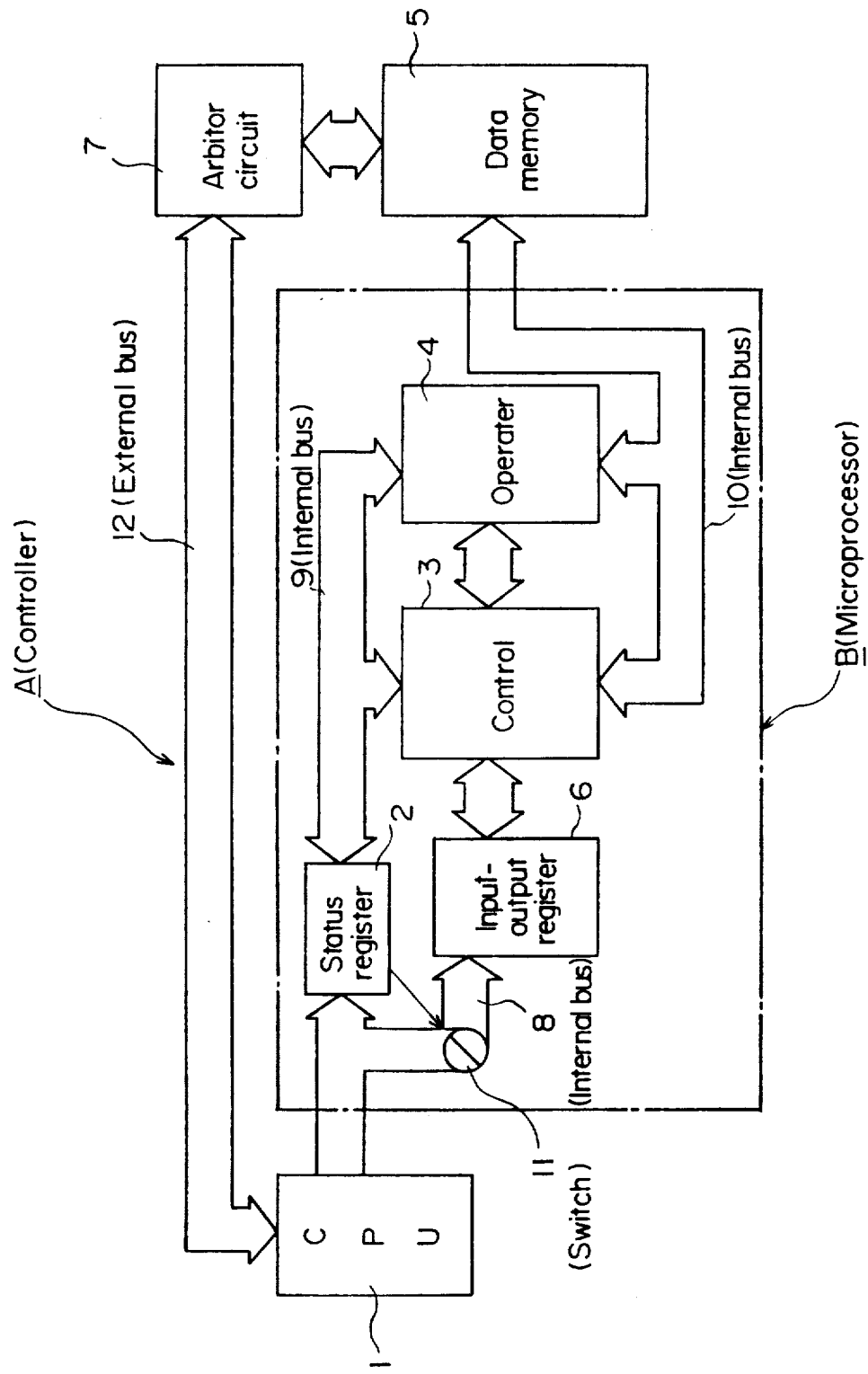
FIG. 1 is a block diagram showing a basic circuit configuration as a first embodiment of the invention.

As shown in FIG. 1, a controller A generally comprises a CPU 1 for controlling the input and output of signals, a microprocessor B and a data memory 5 for storing knowledge data processed by the microprocessor B.

The microprocessor B is provided with a status register 2 showing the status of operation of the microprocessor B, a controller 3 for receiving signals from CPU 1 through said status register 2 and generating control signals according to the received signals, and an operator 4 for performing fuzzy reasoning or arithmetic operations to provide knowledge data in accordance with signals incoming from said status register 2 through an internal bus 9, and an internal bus 10 which is not only connected to said controller 3 and operator 4 but also to said data memory 5 for storing the knowledge data from the operator 4.

An internal bus 8 connecting said CPU 1 to said status register 2 branches out to couple with the controller 3 via an input-output register 6.

This internal bus 8 includes a switch 11 which goes ON or OFF according to the status of operation of microprocessor B which is indicated on the status register 2.

Furthermore, an external bus 12 connects said CPU 1 to said data memory 5 through an arbiter circuit 7.

Figure 3:
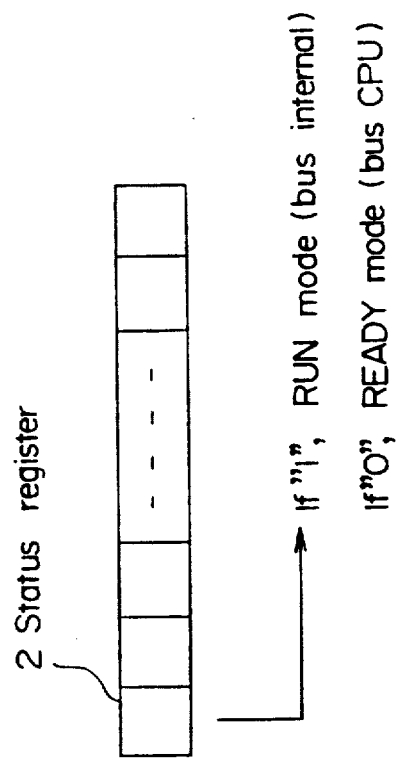
FIG. 3 is an elementary diagram showing the input mode of a status register used in the processor of the invention.

The status register 2 is typically constructed as shown in FIG. 3. Thus, it is set to −RUN mode (bus internal) if the input address signal is "1" or −READY mode (bus CPU) if the address signal is "0", to thereby control the ON/OFF action of the switch 11.

The action of the above microprocessor B is now described with reference to FIG. 2.

Figure 2:
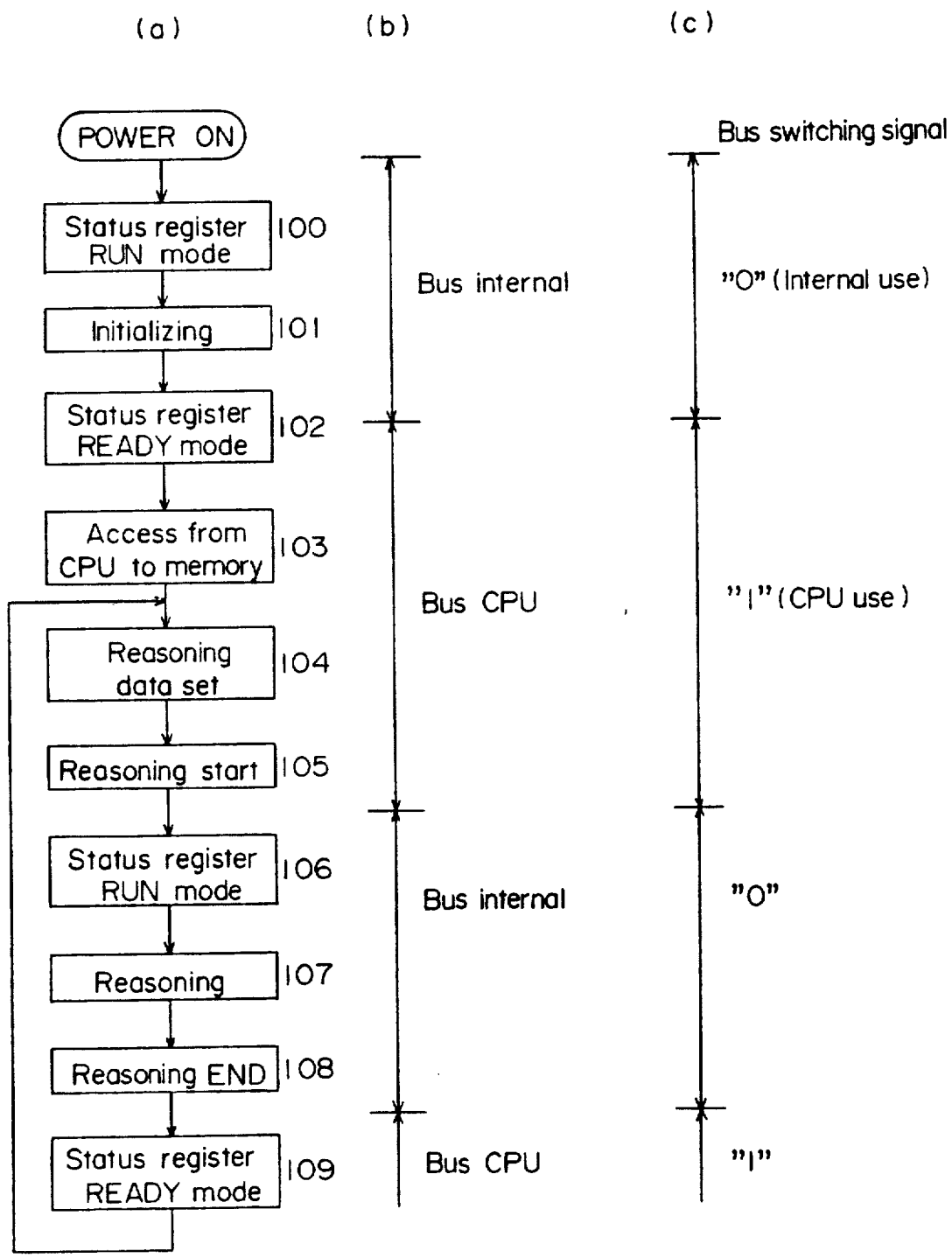
FIG. 2 (a) is a flow chart of the processor of the invention.

Referring, first, to the flow chart shown in FIG. 2 (a), the microprocessor B starts operating as the controller A is switched on (POWER ON).

In step 100, the status register 2 is set to the RUN mode.

In step 101, the operator 4 of the microprocessor B performs initializing in accordance with an input signal from the CPU 1 and the knowledge data are written and stored in the data memory 5.

As the initializing is complete, the sequence proceeds to step 102 where the status register 2 is set to the READY mode and the switch 11 in the internal bus 8 is turned ON for acceptance of signals from CPU 1. In step 103, CPU 1 outputs a signal demanding knowledge data to the controller 3 via the input-output register 6.

In step 104, the controller 3 is turned ON to present reasoning data to the operator 4 and the sequence proceeds to step 105.

In step 105, the operator 4 begins to perform reasoning.

In step 106, the status register 2 is set back to the RUN mode and the sequence proceeds to step 107. In step 107, the operator 4 starts fuzzy reasoning, for instance, to fulfill said demand for knowledge data from CPU 1.

As the fuzzy reasoning by the operator 3 is completed in step 108, the sequence proceeds to step 109 and the status register 2 is automatically switched to the READY mode. The sequence now returns to step 104.

Then, the above sequence of step 104 to step 109 is repeated.

FIG. 2(b) and (c) indicate the use status of the bus and the input status of a switching signal in each step shown in FIG. 2(a).

Access for knowledge data from CPU 1 to the data memory 5 can be made via the arbiter circuit 7 and external bus 12.

Thus, since the switch 11 is disposed in the internal bus 8 and all control actions are performed in hardware according to the status of operation of the microprocessor B as indicated by the status register 2, accurate operation of the microprocessor B is insured with a simplified circuit configuration.

Furthermore, it is no longer necessary to provide an arbiter circuit on the CPU side, nor is an arbitration software required for CPU 1. Therefore, system architecture is remarkably simplified.

Figure 4:
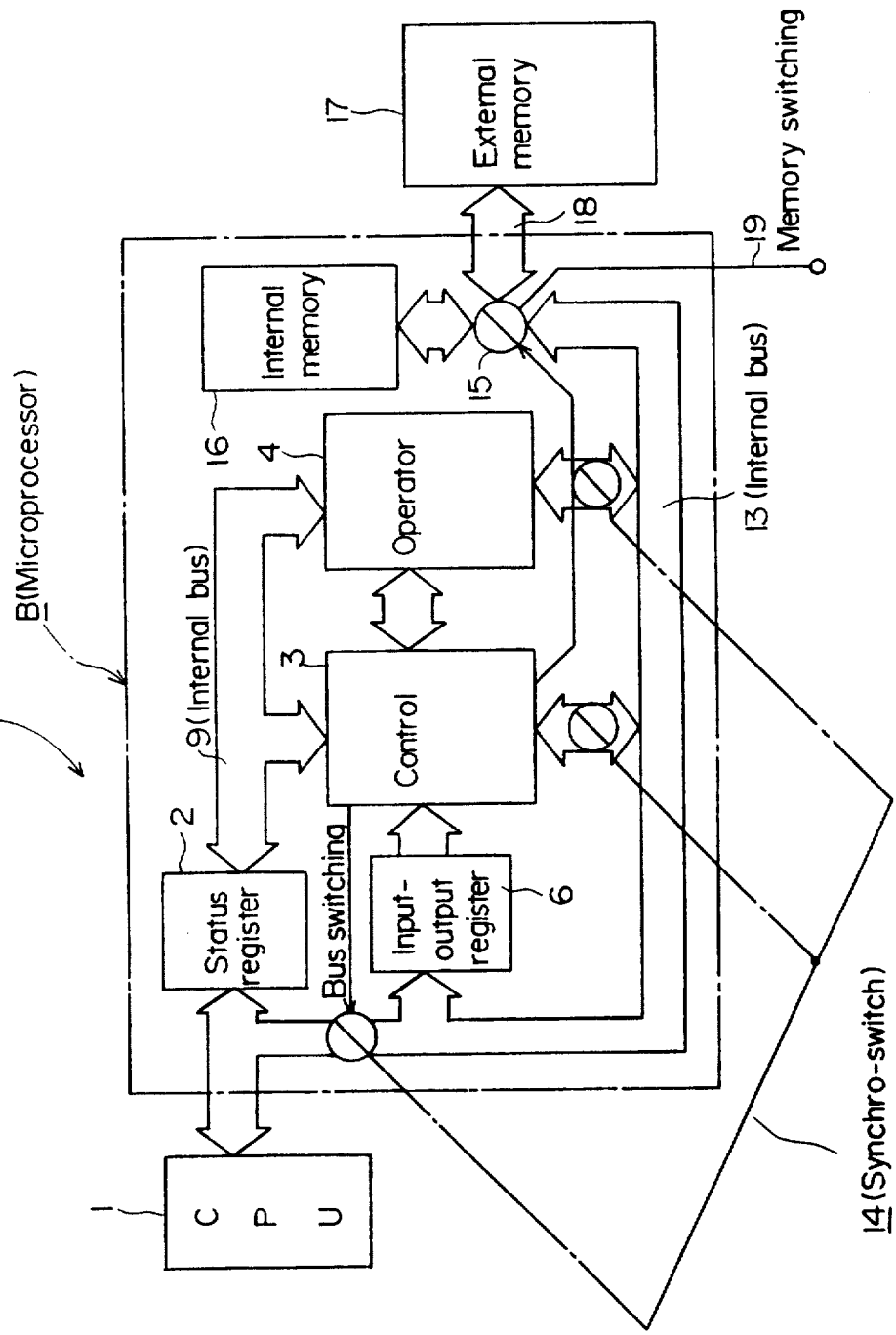
FIG. 4 is a block diagram showing a basic circuit configuration as a second embodiment of the invention.

FIG. 4 is a block diagram showing a basic processor circuit configuration as a second embodiment of the invention.

It should be understood that the like parts are designated by the like numerals used for the first embodiment.

In this embodiment, an internal bus 13 is disposed in a microprocessor B and a synchro-switch 14 is driven in accordance with the status of action of microprocessor B which is indicated by the status register 2.

It is further arranged so that an internal memory 16 and an external memory 17 can be selectively accessible via a switch 15. Thus, neither an external bus nor an arbiter circuit is required.

Therefore, the whole architecture of the controller A can be even more simplified as compared with the first embodiment and an increased ease of use is insured.

A memory switch controller 19 automatically drives the switch 15 in such a manner that when the available capacity of the internal memory 16 is small, the external memory 17 such as an external hard disk is utilized.

As the above embodiments indicate, the signal processor according to the present invention is suitable for use not only as a general signal processor but also as a fuzzy processor.

It will be apparent from the above description that because the processor of the invention includes a built-in switch means for controlling the input of signals to the first input-output control means and permitting association with the second control means, the knowledge data stored in the internal memory of the processor can be efficiently transmitted and even when a plurality of demands for the memorized knowledge data are made to the processor, the status register sets an order of priority to perform all controls in hardward construction, with the result that not only an accurate data transmission is insured but a one-chip microprocessor with a freedom of change in knowledge data can be used to simplify the circuit configuration and, hence, insure an ease of system architecture. Moreover, the invention enables effective utilization of space, insures ease of use and promises a reduction of manufacturing cost.

The above description and the accompanying drawings are merely illustrative of a few modes of application of the principles of the present invention and are not limiting. Numerous other arrangements which embody the principles of the invention and which falls within its spirit and scope may be readily devised by those skilled in the art. Accordingly, the invention is not limited by the foregoing description, but is only limited by the scope of the appended claims.

What is claimed is:

1. A signal processing system comprising:
   a signal processor for receiving input signals and generating output signals in accordance with the content of the input signals, said signal processor including an internal bus for carrying signals among components of said signal processor;
   a memory;
   a first input-output control means for controlling the application of said input signals to said signal processor and the output of control signals generated by said signal processor;
   said signal processor further comprising a status register connected to said internal bus for determining whether said signal processor is using said internal bus;

an operational means connected to said internal bus for executing an operation and providing knowledge data in accordance with said input signals provided by said first input-output control means;

a second input-output control means coupled to said internal bus and to said first input-output control means through an input-output register, said second input-output control means storing knowledge data provided by said operational means in said memory; and.

a switch means having a first switch portion connected between said input-output register and said first input-output control means and adapted to be switched off or on according to whether said internal bus is being used by said signal processor, said first switch portion controlling whether said various input signals from said first input-output means are applied to said input-output register of said signal processor.

2. A system as in claim 1, wherein said status register indicates whether said internal bus is in a run mode or a ready mode. said status register controlling said switch means to allow said first input-output control means to apply said input signals to said input-output register only when said internal bus is in a ready mode.

3. A system as in claim 1. further comprising a data bus connecting said first input-output control means with said memory.

4. A system as in claim 3, further comprising an arbiter circuit connected between said data bus and said memory.

5. A system as in claim 2, wherein said signal processor further comprises another memory and said switch means also includes a second switch portion for switching the output of said operational means between said memory and said another memory.

6. A system as in claim 1, further comprising another internal bus for connecting said first input-output control means with said memory, said switch means including a second switch portion for controlling the connection of said first input-output control means with said another internal bus.

7. A system as in claim 6 wherein said memory, operational means, and second input-output control means are connected to said another internal bus through respective second, third and fourth switch portions of said switch means, the operational state of said first, second, third and fourth switch portions being determined by said second input-output control means.

* * * * *